JOHN PETERS.

Improvement in Steam Boiler Float Valves.

No. 122,053. Patented Dec. 19, 1871.

Witnesses:
A. Bennemendorf
Alex F. Roberts

Inventor:
J. Peters
Per Munn & Co.
Attorneys.

UNITED STATES PATENT OFFICE.

JOHN PETERS, OF HAVERSTRAW, NEW YORK.

IMPROVEMENT IN STEAM-BOILER FLOAT-VALVES.

Specification forming part of Letters Patent No. 122,053, dated December 19, 1871.

Specification describing a certain Improved Low and High Water Detecter for Steam-Boilers, invented by JOHN PETERS, of Haverstraw, in the county of Rockland and State of New York.

Figure 1:
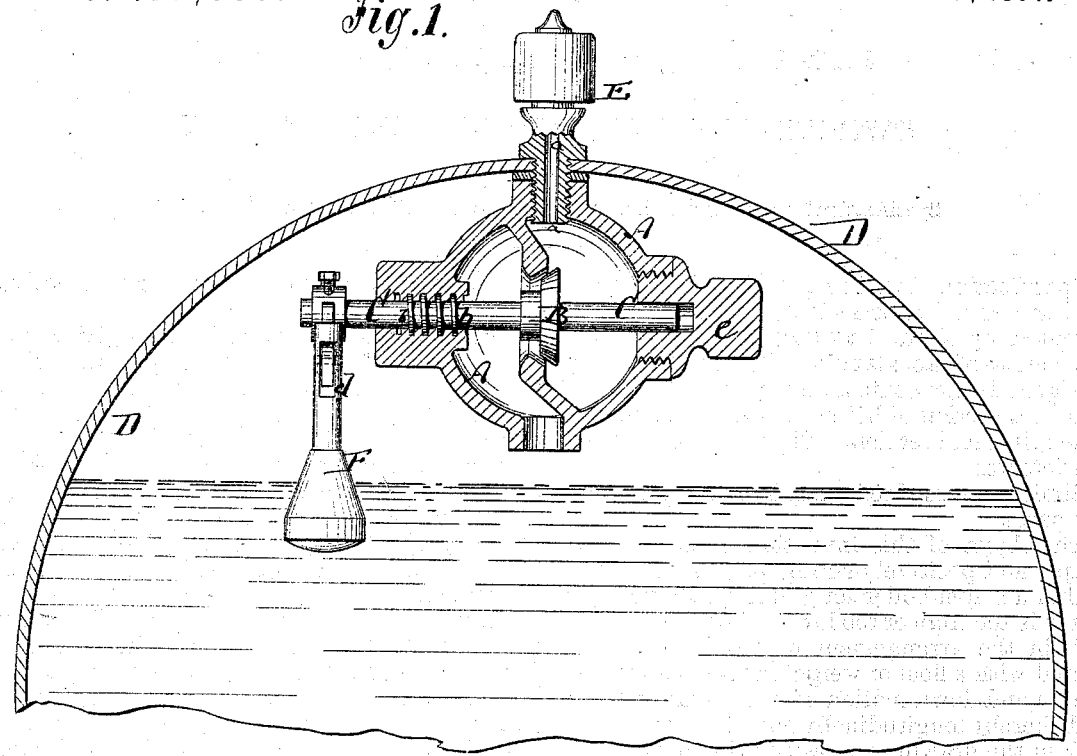
Figure 2:
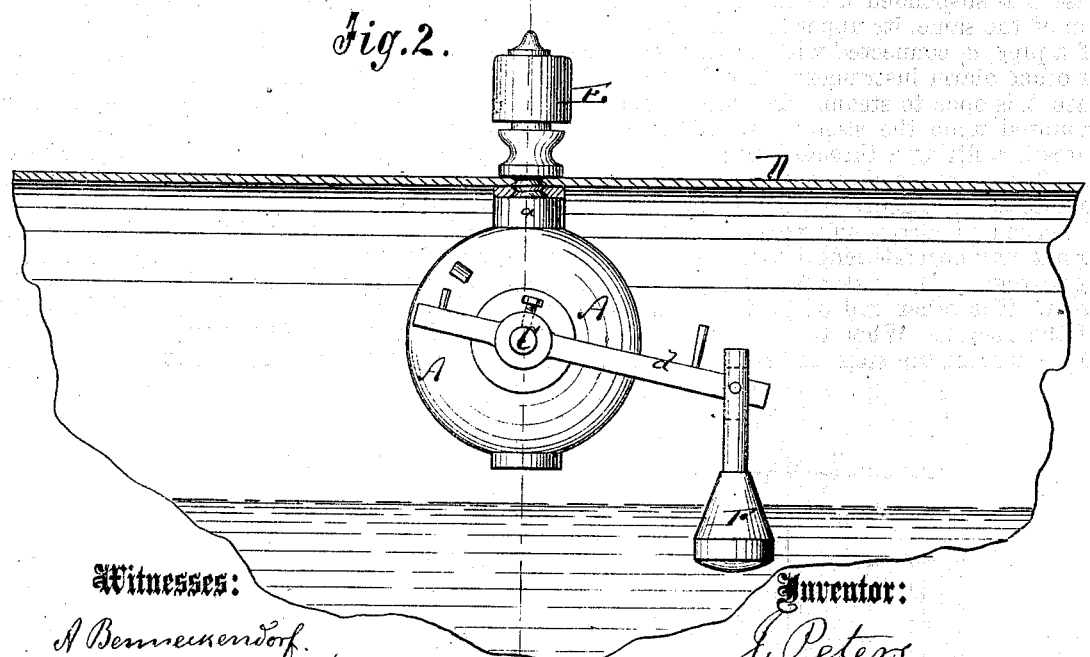

Figure 1 represents a vertical transverse section of a section of boiler, showing the detecter in longitudinal section. Fig. 2 is an end view of the detecter.

Similar letters of reference indicate corresponding parts.

The object of this invention is to produce a simple and positively-acting valve arrangement within a steam-boiler for giving notice when the water is too high or too low. The invention consists in the arrangement of a screw-valve connected with a float or weight in such manner that the up-and-down motion of the latter will turn, and thereby longitudinally adjust the valve.

A in the drawing represents the case containing the valve. B is the valve; C, its stem. The case A is suspended into the boiler D from the top of the same, its upper part being, by means of a pipe, $a$, connected with a steam-whistle, E, or other alarm instrument. At the bottom the case A is open to steam. The valve is securely mounted upon the stem C, which has a screw-thread, $b$, fitting a threaded portion of the case A. This screw makes a steam-tight packing unnecessary. At one end the stem projects from the case and carries on an arm, $d$, a float, F. The arm $d$ may be made lengthwise adjustable in order to regulate the distance between the float and stem. The other end of the stem fits a cap, $e$, of the case A. When the float is moved up or down it turns the stem and thereby screws it in or out, and thereby opens or closes the valve in the desired manner.

Thus, when the device is arranged as a low-water detecter, the float, when up, will hold the valve closed, but will cause it to open when the water sinks, and causes the float to be lowered. The necessary alarm will then be given by the steam passing through the case A to the whistle.

When the apparatus is to be used as a high-water detecter, the float need only be made to project from the opposite side of the stem, so as to close the valve in descending and open it in ascending.

It will be noticed that the parts of this apparatus are entirely concealed within the boiler, and can therefore not readily be tampered with.

The arm $d$ is provided with projecting stages, whereby its up-and-down motion is regulated and the consequent movement of valve defined.

It is obvious that my invention may be used for other purposes besides merely indicating the height of water in a boiler; and I do not, therefore, limit myself in its application.

Having thus described my invention, I claim as new and desire to secure by Letters Patent—

1. The combination of the float F, arm D, and screw-stem C with the valve B, case A, and alarm instrument E, all arranged substantially as herein shown and described.

2. The combination of float F, arm $d$, screw-stem C, valve B, and case A, substantially as shown and described.

JOHN PETERS.

Witnesses:
THEODORE GARDNER,
THEODORE FREDERICK.

(148)